(12) United States Patent
Fumez

(10) Patent No.: US 6,820,377 B2
(45) Date of Patent: Nov. 23, 2004

(54) PORTABLE MOBILE UNIT FOR PRODUCING PANELS DESIGNED GENERALLY FOR BUILDING

(75) Inventor: Didier Fumez, Bons en Chablais (FR)

(73) Assignee: Groupe P.A.D.F., Inc., Boucherville (CA)

(*) Notice: Subject to any disclaimer, the term of this patent is extended or adjusted under 35 U.S.C. 154(b) by 0 days.

(21) Appl. No.: 09/958,470

(22) PCT Filed: Feb. 7, 2001

(86) PCT No.: PCT/FR01/00353
§ 371 (c)(1),
(2), (4) Date: Sep. 24, 2002

(87) PCT Pub. No.: WO02/062546
PCT Pub. Date: Aug. 15, 2002

(65) Prior Publication Data
US 2003/0123954 A1 Jul. 3, 2003

(51) Int. Cl.[7] .............................. E02D 35/00
(52) U.S. Cl. ................ 52/122.1; 52/111; 52/126.1; 52/632; 248/352; 254/423; 254/424; 280/763.1
(58) Field of Search .................. 52/632, 111, 112, 52/122.1, 126.1

(56) References Cited

U.S. PATENT DOCUMENTS

| | | | |
|---|---|---|---|
| 3,181,482 A | * | 5/1965 | Heth et al. |
| 3,402,520 A | | 9/1968 | Lee et al. |
| 3,707,165 A | | 12/1972 | Stahl |
| 3,710,607 A | * | 1/1973 | Beymer .................. 72/30 |
| 4,138,283 A | | 2/1979 | Hanusa |
| 4,207,041 A | * | 6/1980 | Kampiziones ............. 425/62 |
| 4,424,985 A | * | 1/1984 | Holmes ................. 280/766.1 |
| 4,660,399 A | * | 4/1987 | Suter et al. ............... 72/181 |
| 5,725,346 A | * | 3/1998 | Davina .................... 414/111 |
| 5,853,512 A | | 12/1998 | McKinney |

* cited by examiner

Primary Examiner—Carl D. Friedman
Assistant Examiner—Yvonne M. Horton
(74) Attorney, Agent, or Firm—Baker Botts L.L.P.

(57) ABSTRACT

A one piece assembly of a small production unit (23) for panels intended for building comprises an upper tray (2) a bottom tray of longer length (1) a collapsible crane (7) situated on the upper tray (2) supporting the crane structure (7) is horizontally mobile with rollers (11) supported on rail (12) positioned on the bottom tray (1) without requiring an external support lying on the ground. The vertical movement of the upper tray (2) is assured by an assembly of screw jacks (4), plates (18), guides (14) and runners (13).

The compact assembly (23) of the production unit can be moved from site to site without heavy handling movement.

6 Claims, 3 Drawing Sheets

PORTABLE MOBILE UNIT FOR PRODUCING PANELS DESIGNED GENERALLY FOR BUILDING

BACKGROUND OF THE INVENTION

1. Field of the Invention

The present invention concerns to a compact assembly of a mechanical press and machinery forming a transportable unit for the onsite production of panels for the construction of buildings.

2. Description of the Prior Art

It is known that the fabrication of different panels is generally obtained from fixed production units. These units are generally of heavy construction and located geographically away from the panel erection site.

These production units being distant from the erection site require the panels to be transported by road which involves time and financial cost. The transportation time is prejudicial to the speed of installation at the building site.

The panels obtained from these production units located remotely away from the building site must be protected from weathering during their transportation. Also the transportation vehicles are generally equipped with cumbersome stands to maintain the panels in a fixed and vertical position.

The production of panels remote from the building site is more costly and less flexible than the production made at the building site. Also, there is a need for road infrastructure designed for heavy load traffic, with certain countries not having the necessary road infrastructure.

SUMMARY OF THE INVENTION

The present invention allows for the on-site production of different types of insulated, weather resistant panels for the construction of diverse buildings starting from an easily transportable unit with a significant production capacity.

The present invention allows for the rapid production of the required panels for a small construction assembly and in a few hours the mobile unit can be moved to another building site.

The description of the process of this small production unit is an association of individual elements which are essential to contain the high pressure, (if necessary) or not, from the various products constituting the manufacture of the different panels that are obtained.

The concept of the present invention doesn't require mechanical and electromechanical sophistication, which allows the employment of non-specialized man-power for the maintenance of this small panel process and the production of the diverse panels obtained with this unit.

BRIEF DESCRIPTION OF THE DRAWINGS

A more complete understanding of the present disclosure and advantages thereof may be acquired by referring to the following description taken in conjunction with the accompanying drawings wherein.

Figure 1:
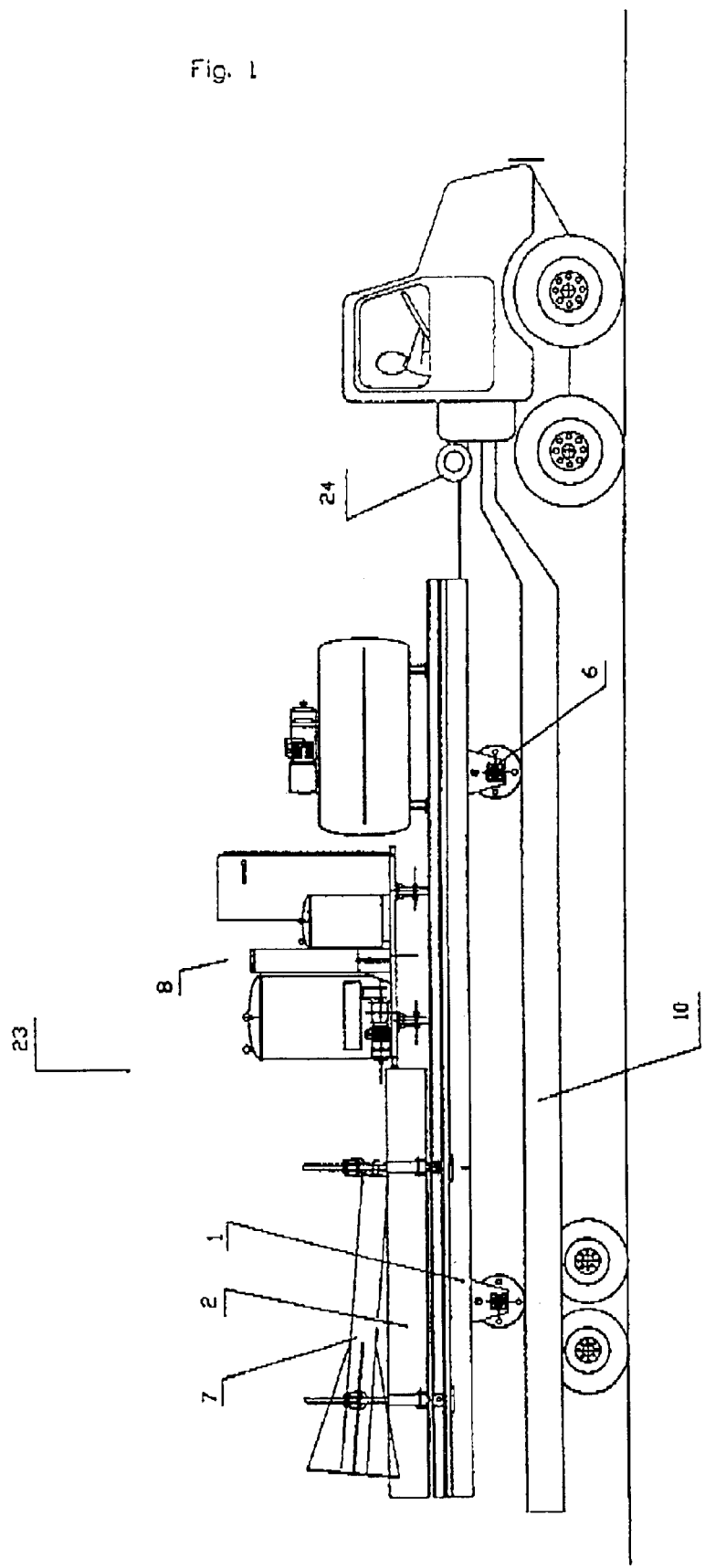
FIG. 1 represents: the unitized transportable assembly
Figure 2:
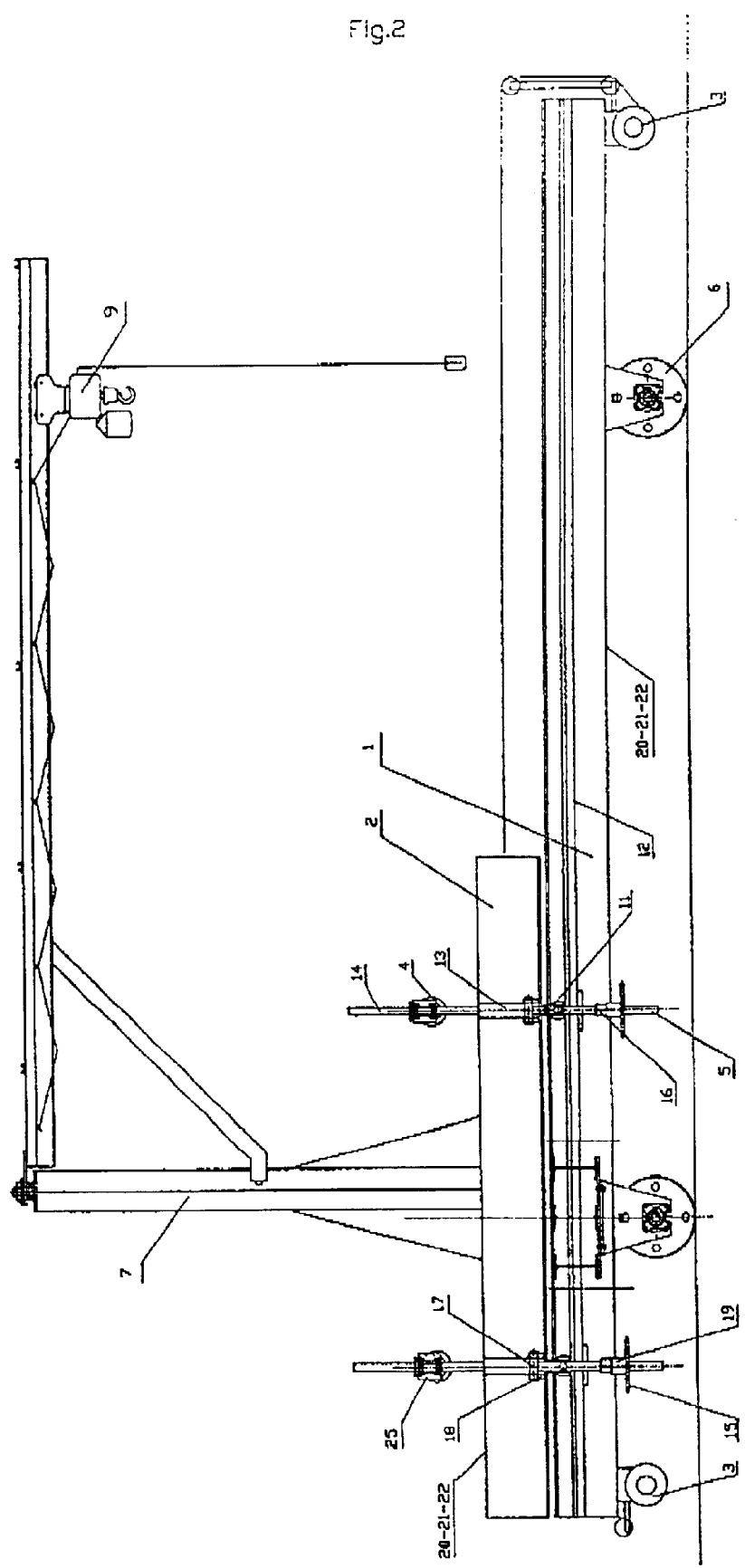
FIG. 2 represents: a longitudinal view of the production unit
Figure 3:
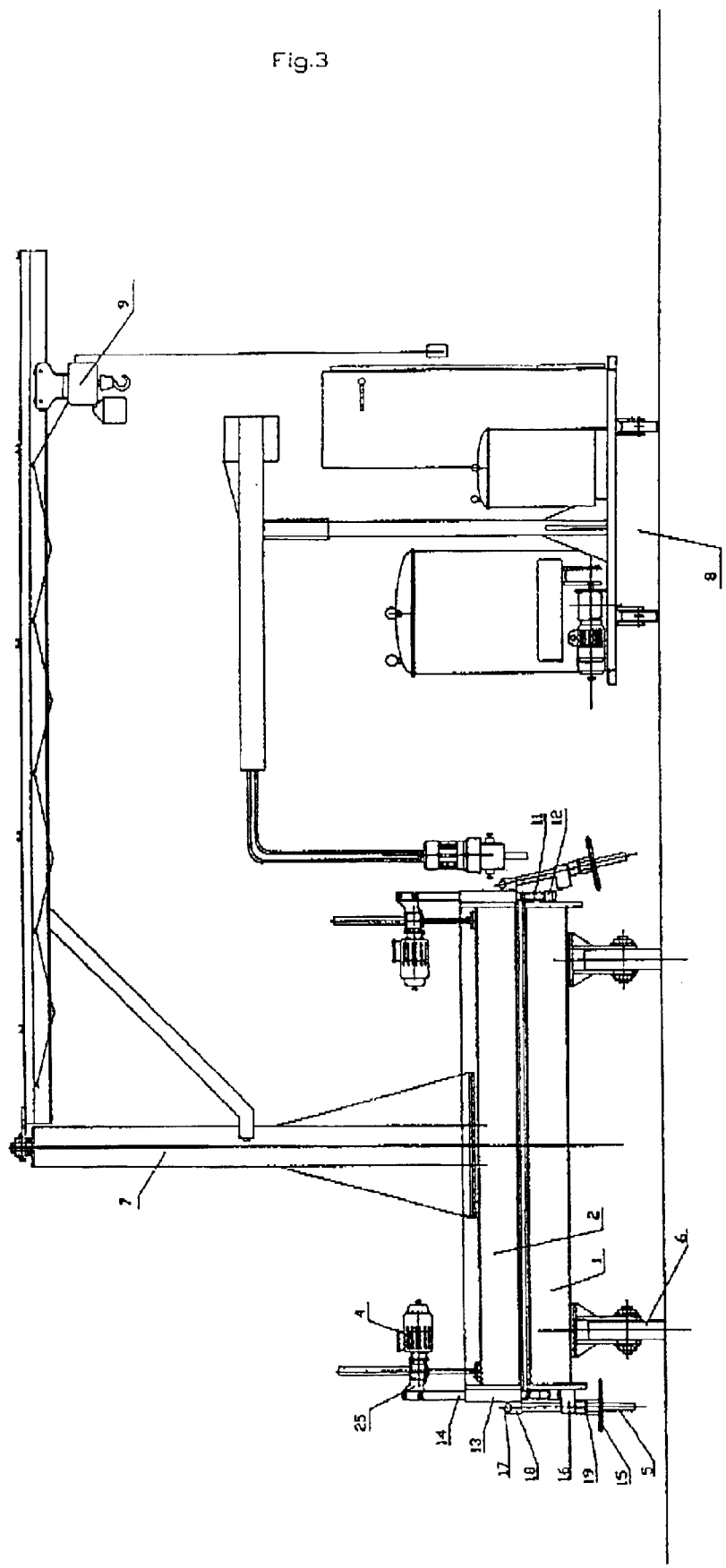
FIG. 3 represents: a transverse view of the production unit

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention as defined by the appended claims are intended to be covered.

DETAILED DESCRIPTION OF SPECIFIC EMBODIMENTS

The description of the process of this small production unit is an association of individual elements which are essential to contain the high pressure, (if necessary) or not, from the various products constituting the manufacture of the different panels that are obtained.

The concept of the present invention doesn't require mechanical and electromechanical sophistication, which allows the employment of non-specialized man-power for the maintenance of this small panel process and the production of the diverse panels obtained with this unit.

The present invention concerns the assembly of a small press comprising a bottom tray (1) an upper tray (2) with movement in a horizontal plane by winches (3), the vertical movement being assured by mechanical screw jacks (4) the tightening of the upper tray to the bottom tray is judiciously made by the aid of manually operated trapezoidal step screw (5).

For it's various operations, the small press assembly is serviced by a rotating crane (7) which itself is situated on the upper tray that travels with the latter as it serves the small mobile production unit. The crosspiece is equipped with a hoist (9) for handling the various elements that move about.

A complementary machine (8) for the injection or pouring of various products to obtain different panels is situated longitudinally to the bottom tray. This machine includes a manual transmission in order to feed the production assembly unit thus described.

The present invention concerns the assembly of this transportable production unit on only one trailer (10) without the need for heavy handling equipment. The compact unit assembly is moved onto the trailer with the winch (24) of the transportation truck.

The moving of the unit assembly is made possible with wheels (6) situated on the bottom tray (1) that support the compact assembly of the small production unit. These wheels are fixed during manufacture.

The dimensions of the upper and lower plates are variable, correspond to the standard for a wide convoy and don't require a special convoy.

The present invention is characterized in part, by it's ability to make different thickness panels without the need to make intermediary set-ups, the trapezoidal tightening screws (5) being of longer length than the maximum thickness panels to be made.

The upper part of the trapezoidal screw (5) has an axis (17) supported by a female part (18) and a linked mechanism that allows spreading of the screw assembly (5) during the movement of the upper tray (2).

The tightening of bottom and upper tray assembly is achieved by the trapezoidal screw (5) equipped with a hand wheel (15) driving a trapezoidal nut (19) that is supported on a blocking-flange (16) that itself is supported on transmission rail (12) fixed at the bottom tray (1).

It's easy to understand that there is no need for different set-ups to be made for the different panel thickness.

The present invention is characterized by it's own system of lifting the upper plate (2) which is positioned at the right distance according to the pressure to be maintained. Runners (13) equipped with guiding rods (14), that are fixed inside rollers (11) allowing the horizontal translatory motion and the mechanical parts (18) at their upper parts for the attachment of the mechanical screw jacks (4).

The upper tray (2) being firmly connected to the mechanical screw jacks (4) moves vertically, taking support on rollers (11) by intervening guiding rods (14) and the sliders (13). The rollers (11) being supported on the guide rails (12) themselves attached longitudinally on the bottom tray (1).

The present invention is characterized by the positioning of the guide rails (12) for horizontal transmission on the bottom tray (1) eliminating the need to employ an external crossbeam supported on the ground for the displacement of the upper tray. The winches (3) situated at the ends of the bottom tray (1) allow the movement of the upper tray (2). These wheels are retractable during panel production.

The present invention is characterized by the rapid deployment of the small production unit. The bottom tray (1) and the upper tray (2) are joined together by blocking the trapezoidal screws (5), the crane (7) being lowered and fixed on the tray. The other machinery is positioned on the remainder of the bottom tray thus forming a very compact assembly.

The compact assembly of the small production unit can easily be put on a flat bed trailer (10). The assembly is made mobile by the wheel (6) attached to the bottom tray (1) and pulled by a winch (24), with the one part resting on the ground on an inclined plane and the other part being hauled on the assembly is transportable with a regular truck.

The present invention is also characterized by the rapid deployment of the small production unit assembly. The time to dismantle and reassemble requires only a few hours.

The present invention is also characterized by the fabrication of upper and lower trays being comprised of commercial profiles without recourse to drilling and tapping, the different profiles (20) (21) (22) being assembled by welding. This allows the cost of fabrication to be very competitive.

What is claimed is:

1. A compact mobile production assembly unit for fabricating different panels of different thickness made for the construction of buildings comprising lower and upper trays, trapezoidal screws for joining the upper tray to the lower tray, mechanical screw jacks attached to the upper tray for adjusting vertical movement of the upper tray and linked to guiding rods said guiding rods being equipped with rollers for rolling at their lower ends for horizontal movement of the upper tray and set nuts for automatically positioning the lower and upper trays according to the dimensions of the panels.

2. The compact mobile production assembly unit according to claim 1 further comprising a horizontal guiding rail which supports said rollers to drive said upper tray to a higher position, the mechanical screw jacks applying a pressure on said rollers by the intermediary of said guiding rods.

3. A compact mobile production assembly unit for fabricating panels of different thickness made for the construction of buildings comprising lower and upper trays, the upper tray being attached to mechanical screw jacks linked to guiding rods, and said guiding rods being equipped with rollers for rolling at their lower ends for horizontal movement of the upper tray.

4. The compact mobile production assembly unit according to claim 3 further comprising wheels attached to the lower tray and acting as support beams during the on site operation and enabling said compact mobile production assembly unit to be moved and loaded on a trailor.

5. The compact mobile production assembly unit according to claim 3 further comprising an orientable jib crane equipped with a hoist, said orientable jib crane being attached and movable with the upper tray to allow it to serve different work stations.

6. The compact mobile production assembly unit according to claim 3 further comprising a horizontal guiding rail which supports said rollers to drive said upper tray to a higher position, the mechanical screw jacks applying a pressure on said rollers by the intermediary of said guiding rods.

* * * * *